United States Patent
Kojima et al.

(10) Patent No.: US 8,469,604 B2
(45) Date of Patent: Jun. 25, 2013

(54) OPTICAL FIBER, TAPE-LIKE OPTICAL FIBER AND OPTICAL MODULE USING THE SAME

(75) Inventors: Seiji Kojima, Hitachi (JP); Kanako Suzuki, Hitachi (JP); Mikio Ohkoshi, Hitachi (JP); Yoshikazu Namekawa, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 230 days.

(21) Appl. No.: 12/805,367

(22) Filed: Jul. 27, 2010

(65) Prior Publication Data
US 2011/0038583 A1 Feb. 17, 2011

(30) Foreign Application Priority Data
Jul. 30, 2009 (JP) ................................. 2009-178144

(51) Int. Cl.
*G02B 6/02* (2006.01)
*G02B 6/36* (2006.01)
*G02B 6/44* (2006.01)

(52) U.S. Cl.
USPC .............................. 385/78; 385/114; 385/123

(58) Field of Classification Search
USPC .......................................... 385/78, 114, 123
See application file for complete search history.

(56) References Cited

U.S. PATENT DOCUMENTS

| | | | |
|---|---|---|---|
| 2002/0102086 A1* | 8/2002 | Fewkes et al. | 385/128 |
| 2004/0161205 A1* | 8/2004 | Hengelmolen et al. | 385/78 |
| 2006/0246772 A1 | 11/2006 | Yamaguchi et al. | |
| 2008/0279516 A1* | 11/2008 | Chen et al. | 385/124 |

FOREIGN PATENT DOCUMENTS

| | | |
|---|---|---|
| JP | 08-286079 A | 11/1996 |
| JP | 2005-008448 A | 1/2005 |
| JP | 2005-221839 A | 8/2005 |
| JP | 2006-310197 | 11/2006 |
| JP | 2007-256372 | 10/2007 |

OTHER PUBLICATIONS

Japanese Office Action dated Oct. 23, 2012 with English translation thereof.

\* cited by examiner

*Primary Examiner* — Ryan Lepisto
*Assistant Examiner* — Jerry Blevins
(74) *Attorney, Agent, or Firm* — McGinn IP Law Group, PLLC

(57) ABSTRACT

An optical fiber has a single-layer coated optical fiber having an optical bare fiber including a core and a clad formed around the core, and a single coating layer provided around an outer periphery of the optical bare fiber, an inner coating layer provided around an outer periphery of the single-layer coated optical fiber, which contacts with the single coating layer, and an outer coating layer formed as a collective coating layer around an outer side of the inner coating layer. The inner coating layer has a Young modulus lower than a Young modulus of the single coating layer and a Young modulus of the outer coating layer.

11 Claims, 14 Drawing Sheets

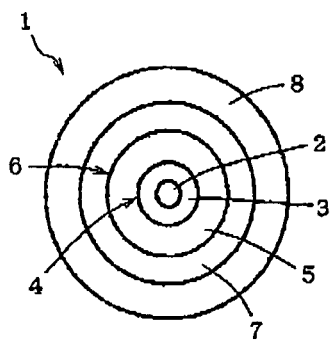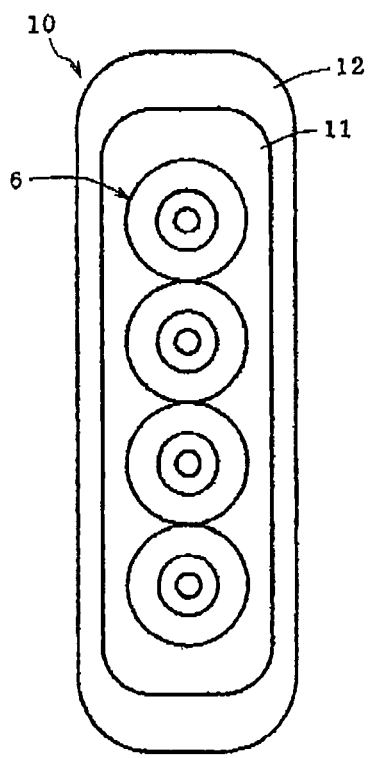

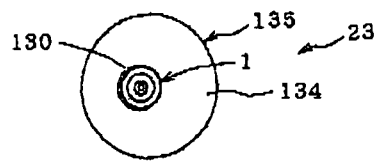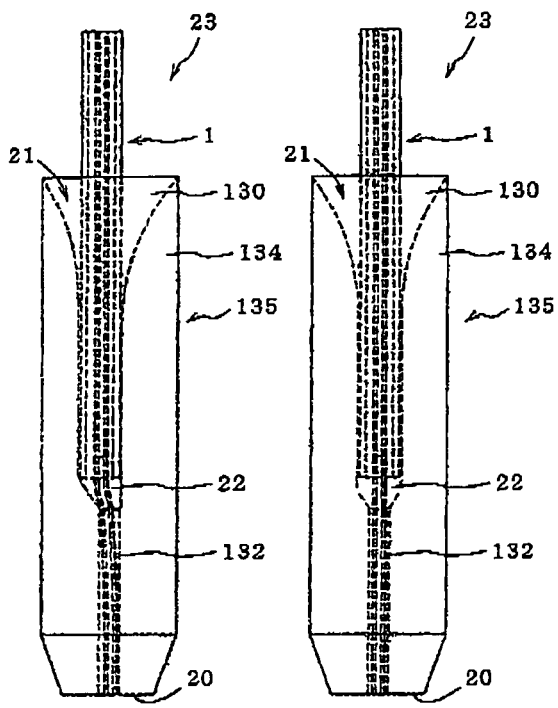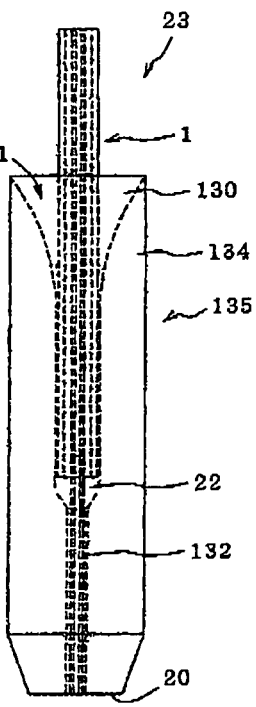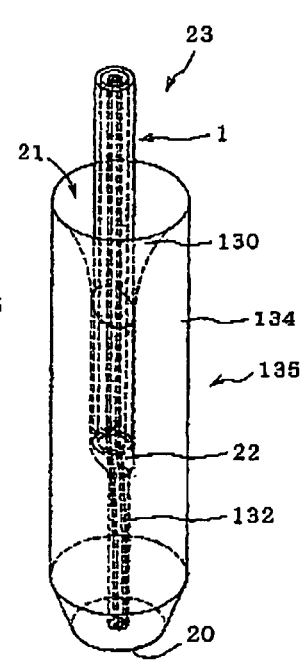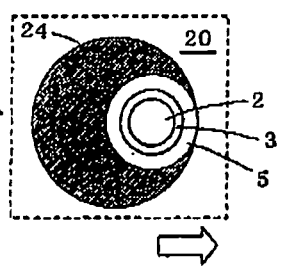

FIG.3A FIG.3B FIG.3C
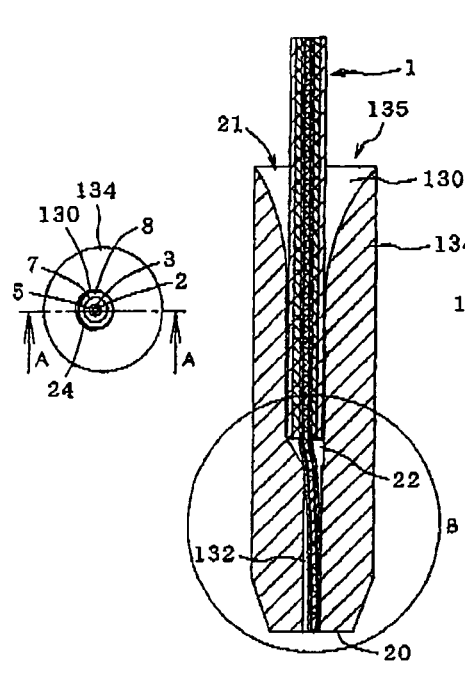
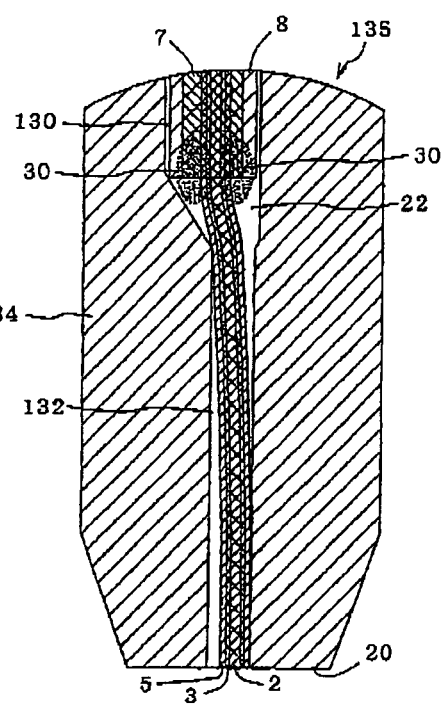

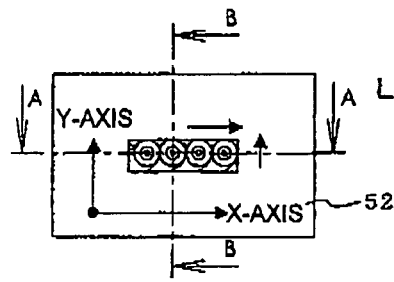
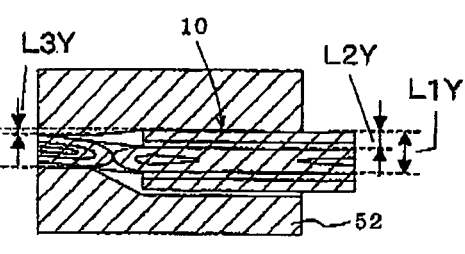
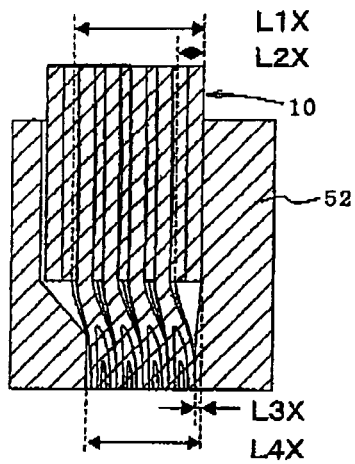
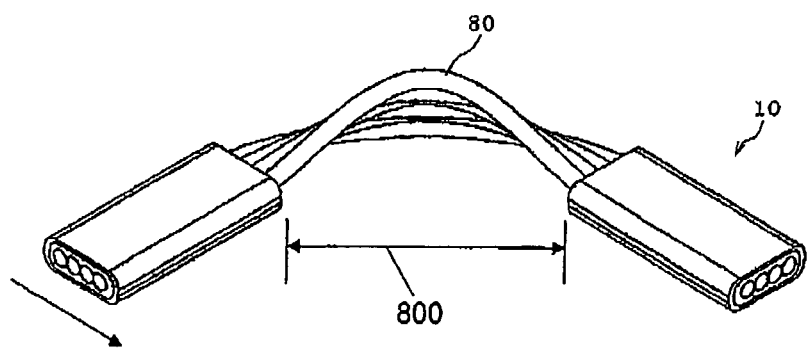

FIG.13A
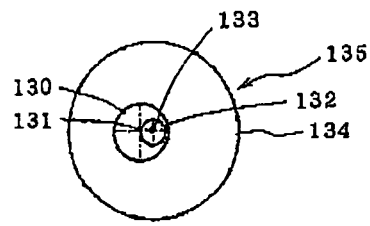
FIG.13B  FIG.13C  FIG.13D
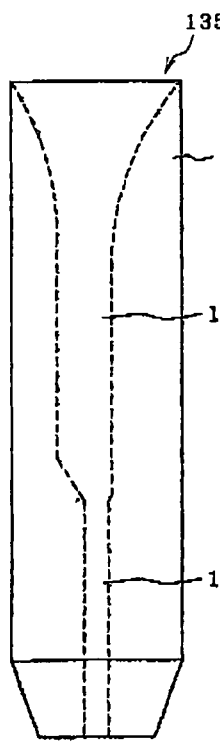 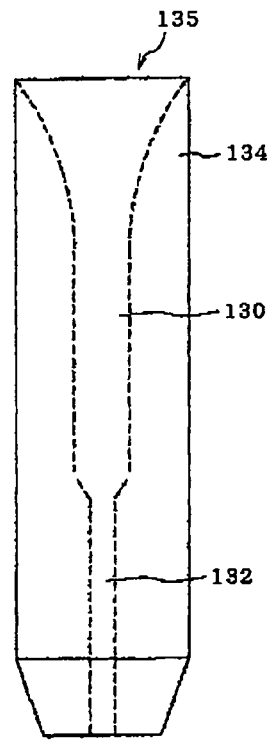 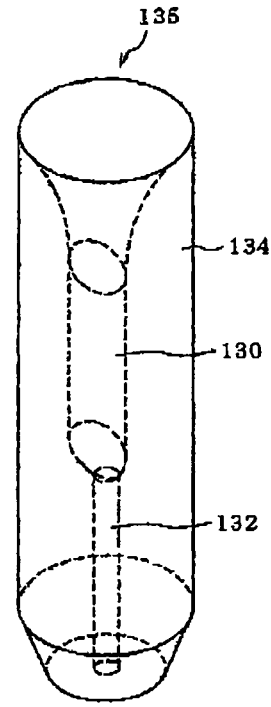
FIG.13E
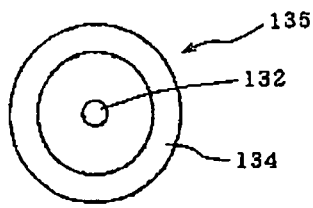

FIG.14A
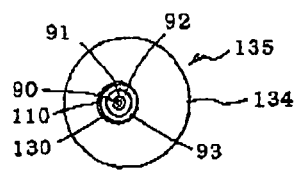
FIG.14B  FIG.14C  FIG.14D
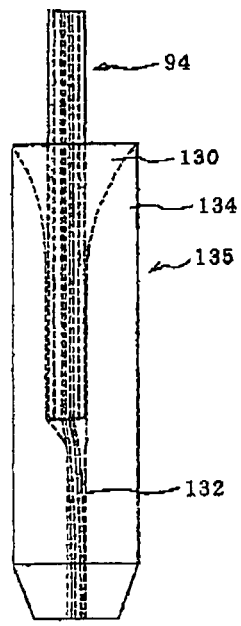 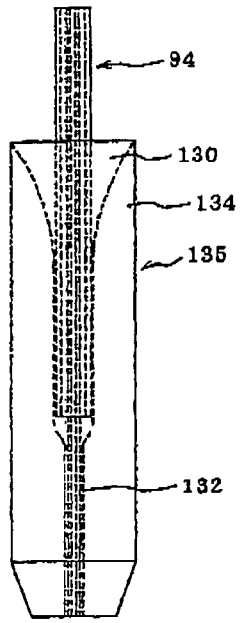 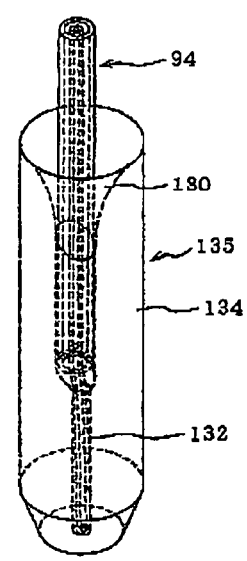
FIG.14E  FIG.14F
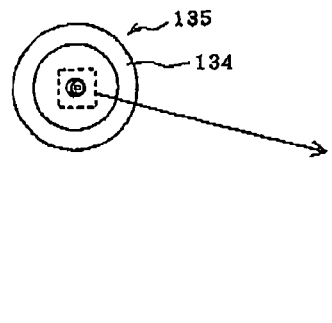 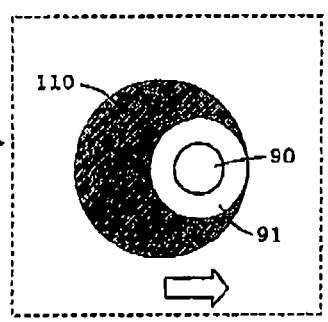

OPTICAL FIBER, TAPE-LIKE OPTICAL FIBER AND OPTICAL MODULE USING THE SAME

The present application is based on Japanese Patent Application Nos. 2009-178144 filed on Jul. 30, 2009, the entire contents of which are incorporated herein by reference.

BACKGROUND OF THE INVENTION

1. Field of the Invention

The present invention relates to an optical fiber, a tape-like optical fiber that are used for an optical transmission path inside a device or between devices, and an optical module using the same.

2. Description of the Related Art

As optical transmission technology inside a device or between devices, optical transmission according to an optical interconnection system attracts attention. In such optical interconnection system, an array-shaped optical device such as VCSEL (Vertical-Cavity Surface-Emitting Laser) that can be easily used for a multi-channel array has been generally used as an optical device. As the optical interconnection system, for example, Japanese Patent Laid-Open No. 2006-310197 (JP-A 2006-310197) discloses a system for connecting between devices by means of an optical cable. For example, Japanese Patent Laid-Open No. 2007-256372 (JP-A 2007-256372) discloses an end face of the optical fiber in the complex cable is connected to an optical device.

As the conventional optical fiber used for optical transmission between array-shaped optical devices such as the VCSEL, for example, a singe-core optical fiber 94 with a structure shown in FIG. 9A, and a multi-core optical fiber (tape-like optical fiber) 96 with a structure shown in FIG. 9B have been used. The single-core optical fiber 94 comprises a core 90, a clad 91, a low Young modulus layer (inner coating layer) 92 having Young modulus of 10 MPa or less and provided around the clad 91, and a high Young modulus layer (outer coating layer) 93 having Young modulus of 100 MPa or more and provided around the low Young modulus layer 92. The multi-core optical fiber 96 comprises a plurality of the single-core optical fibers 94 that are aligned in one column (geometrically in parallel), and the high Young modulus layer (coating layer) 95 having Young modulus of 50 MPa or more and coating the aligned single-core optical fibers 94.

In general, the single-core optical fiber 94 or the tape-like optical fiber 96 is used after its terminal is connected and bonded to a connector and the end face of the connector is polished, in order to be optically connected to devices such as light emitting device, light receiving device, lens, and optical fiber.

For forming a connector from the single-core optical fiber 94, the single-core optical fiber 94 should be inserted into a ferrule. As shown in FIGS. 10A to 10C, a conventional ferrule 100 comprises an optical fiber insertion hole 101 which has an inner diameter greater than an outer diameter of the single-core optical fiber 94 including the inner and outer coating layers 92, 93 and is provided on a side of one end of the ferrule 100, and a light input/output bore 103, which has an inner diameter substantially corresponding to an outer diameter of the clad 91 of the single-core optical fiber 94 (i.e. slightly greater than the outer diameter of the clad 91), and inputs and outputs a light at an end face of another end part 102 of the ferrule 100, in which the optical fiber insertion hole 101 communicates with the light input/output bore 103. As shown in FIG. 11, after inserting an optical fiber composed of the core 90 and the clad 91, the coating (the low Young modulus layer 92 and the high Young modulus layer 93) of which was removed, into the light input/output bore 103 arranged on the other end part 102 of the ferrule 100, and the single core optical fiber 94 is fixed by an adhesive material 110 inside the ferrule 100. After that, a bottom surface 111 which is a light input/output end face of the ferrule 100 is polished.

The multi-core optical fiber 96 has a structure similar to the structure of the single-core optical fiber 94. The high Young modulus layer 95 which collectively coats the multi-core optical fiber 96 is removed, and respective cores are separated from each other. Thereafter, the multi-core optical fiber 96 is inserted into the ferrule, in which bores of the number corresponding to the number of the single-core optical fibers 94 are formed, and terminal-processed similarly to the structure shown in FIG. 11.

SUMMARY OF THE INVENTION

However, when inserting the single-core optical fiber 94 through the optical fiber insertion hole 101 to the light input/output bore 103 arranged on the ferrule 100, as shown in FIGS. 12A to 12D, the light input/output bore 103 arranged on the other end 102 of the ferrule 100 has a larger inner diameter than the outer diameter of the single-core optical fiber 94 (outer diameter of the clad 91). Therefore, the end face of the single-core optical fibers 94 is not positioned the same for each insertion, causing variations of the position of the end face of the single-core optical fiber 94 with respect to an opening of the light input/output bore 103 facing to the bottom surface 111 of the ferrule 100. In other words, reproducibility of the product is not good.

In order to solve this problem, as an optical fiber connecting part that enables the end face of the single-core optical fiber 94 to be arranged in a fixed position with respect to the end face of the light input/output bore 103 formed at the other end 102 of the ferrule 100, the inventors of the present invention proposed to shift a center position 131 of an optical fiber insertion hole 130 and a center position 133 of a light input/output bore 132 as shown in FIGS. 13A to 13E. In other words, the inventors proposed an optical fiber connecting part 135, in which the position of the center axis of the light input/output bore 132 is shifted toward a direction for restricting the optical fiber with respect to the center axis of the optical fiber insertion hole 130.

When inserting the single-core optical fiber 94 into the optical fiber connecting part 135 as described above, the single-core optical fiber 94 is arranged locally bended from the center axis of the optical fiber insertion hole 130 toward the center axis of the light input/output bore 132 inside the ferrule 134 as shown in FIGS. 14A to 14F. According to this structure, the single-core optical fiber 94 can be restricted (bound) in the fixed position of the light input/output bore 132, so that the end face of the single-core optical fiber 94 can be arranged (fixed) with respect to the end face of the light input/output bore 132.

In the case of using the optical fiber coupling part 135, the single-core optical fiber 94 is locally bent from the center axis of the optical fiber insertion hole 130 to the center axis of the light input/output bore 132 inside the ferrule 134 as above. Therefore, the single-core optical fiber 94 the coating (the low Young modulus layer 92 and the high Young modulus layer 93) of which was removed may be broken (disconnected) by the local bending as described above.

Additionally, the single-core optical fiber 94 the coating of which was removed, the surface of the clad 91 may suffer abrasion by contacting contact points 150 and 151 inside the ferrule 134 as shown in FIG. 15C, and the abrasion on the surface may cause a break along with the bending stress inside the ferrule 134.

Therefore, an object of the present invention is to provide an optical fiber and a tape-like optical fiber that is hardly broken under local bending and an optical module using the same.

According to a feature of the invention, an optical fiber comprises:
- a single-layer coated optical fiber comprising an optical bare fiber including a core and a clad formed around the core, and a single coating layer provided around an outer periphery of the optical bare fiber;
- an inner coating layer provided around an outer periphery of the single-layer coated optical fiber, which contacts with the single coating layer; and
- a collective coating layer comprising an outer coating layer formed around an outer side of the inner coating layer,
- wherein the inner coating layer has a Young modulus lower than a Young modulus of the single coating layer and a Young modulus of the outer coating layer.

The single-layer coated optical fiber may be two or more and disposed in parallel.

The inner coating layer may have the Young modulus of 10 MPa or less.

The single coating layer may have the Young modulus of 100 MPa or more and the outer coating layer may have the Young modulus of 50 MPa or more.

According to another feature of the invention, an optical module comprises:
- an optical fiber comprising:
  - a single-layer coated optical fiber comprising an optical bare fiber including a core and a clad formed around the core, and a single coating layer provided around an outer periphery of the optical bare fiber;
  - an inner coating layer provided around an outer periphery of the single-layer coated optical fiber, which contact with the single coating layer; and
  - a collective coating layer comprising an outer coating layer formed around an outer side of the inner coating layer,
  - wherein the inner coating layer has a Young modulus lower than a Young modulus of the single coating layer and a Young modulus of the outer coating layer,
- an optical fiber connecting part comprising:
- a ferrule; and
- a guide bore, which is formed to penetrate through the ferrule from an end face on a side of one end to another end face on a side of another end of the ferrule, and guides the optical fiber inserted from the side of the one end of the ferrule toward the end face on the side of the other end of the ferrule, the guide bore comprising:
  - an optical fiber insertion hole provided on the side of the one end, through which the optical fiber is inserted into the ferrule;
  - a light input/output bore provided on the side of the other end of the ferrule and having an inner diameter smaller than an inner diameter of the optical fiber insertion hole, through which a light is input and output at the end face on the side of the other end of the ferrule; and
  - a shape-changing bore provided between the optical fiber insertion hole and the light input/output bore to communicate therebetween, a shape of which is changed such that an inner diameter of the shape-changing bore is slowly reduced from the optical fiber insertion hole toward the light input/output bore,
  - wherein the shape of the shape-changing bore is changed such that a center axis of the light input/output bore is shifted along a direction for restricting the optical fiber with respect to a center axis of the optical fiber insertion hole.

The single-layer coated optical fiber may be two or more and disposed in parallel.

Advantages of the Invention

According to the present invention, an optical fiber and a tape-like optical fiber that is hardly broken under local bending and an optical module using the same can be provided.

BRIEF DESCRIPTION OF THE DRAWINGS

The preferred embodiments according to the invention will be explained below referring to the drawings, wherein:

FIG. 1A is a transversal cross-sectional view of a single-core optical fiber in an embodiment according to the present invention;

FIG. 1B is a transversal cross-sectional view of a tape-like optical fiber in another embodiment according to the present invention;

FIGS. 2A to 2F are explanatory diagram showing an optical module using a single-core optical fiber of FIG. 1A, wherein FIG. 2A is a top plan view thereof, FIG. 2B is a front view thereof, FIG. 2C is a side view thereof, FIG. 2D is a perspective view thereof, FIG. 2E is a bottom view thereof, and FIG. 2F is an enlarged view of an essential part thereof;

FIGS. 3A to 3C are explanatory diagram showing the optical module using the single-core optical fiber of FIG. 1A, wherein FIG. 3A is a top plan view thereof, FIG. 3B is a cross sectional view along A-A line thereof, and FIG. 3C is an enlarged view of a part B thereof;

FIGS. 5A to 5E are explanatory diagram showing an optical fiber connecting part to which the tape-like optical fiber of FIG. 1B is connected and bonded, wherein FIG. 5A is a top plan view thereof, FIG. 5B is a perspective view thereof, FIG. 5C is a front view thereof, FIG. 5D is a side view thereof, and FIG. 5E is a bottom view thereof;

FIGS. 6A to 6E are explanatory diagram showing an optical module, in which the tape-like optical fiber of FIG. 1B is connected and bonded to the optical fiber connecting part of FIGS. 5A to 5E, wherein FIG. 6A is a top plan view thereof, FIG. 6B is a perspective view thereof, FIG. 6C is a front view thereof, FIG. 6D is a side view thereof, and FIG. 6E is a bottom view thereof;

FIG. 7 is an explanatory diagram showing a condition under which the tape-like optical fiber of FIG. 1B is restricted by the ferrule;

FIG. 8 is an explanatory diagram showing bendability of the tape-like optical fiber in the present embodiment with respect to the optical fiber array direction;

FIGS. 10A to 10C are explanatory diagram showing a conventional optical fiber connecting part, wherein FIG. 10A is a top plan view thereof, FIG. 10B is a side view thereof, and FIG. 10C is a perspective view thereof;

FIGS. 12A to 12D are explanatory diagrams for explaining a problem in the optical fiber connecting part of FIGS. 10A to 10C, wherein FIG. 12A is a front view thereof, FIG. 12B is a perspective view thereof, FIG. 12C is a bottom view thereof, and FIG. 12D is an enlarged view of an essential part thereof;

FIGS. 13A to 13E are explanatory diagrams showing an optical fiber coupling part which solves disadvantages of the optical fiber coupling part of FIGS. 10A to 10C, wherein FIG. 13A is a top plan view thereof, FIG. 13B is a front view thereof, FIG. 13C is a side view thereof, FIG. 13D is a perspective view thereof, and FIG. 13E is a bottom view thereof.

FIGS. 14A to 14F are explanatory diagrams showing an optical module in which the optical fiber of FIG. 9A is connected to the optical fiber connecting part of FIGS. 13A to 13E, wherein FIG. 14A is a top plan view thereof, FIG. 14B is a front view thereof, FIG. 14C is a side view thereof, FIG. 14D is a perspective view thereof, FIG. 14E is a bottom view thereof and FIG. 14F is an enlarged view of an essential part thereof; and FIGS. 15A to 15C are explanatory diagrams showing the optical module in which the optical fiber of FIG. 9A is connected to the optical fiber connecting part of FIGS. 13A to 13E, wherein FIG. 15A is a bottom view thereof, FIG. 15B is a cross sectional view along B-B line thereof, and FIG. 15C is a cross sectional view along A-A line thereof.

DETAILED DESCRIPTION OF THE PREFERRED EMBODIMENTS

Figure 4:
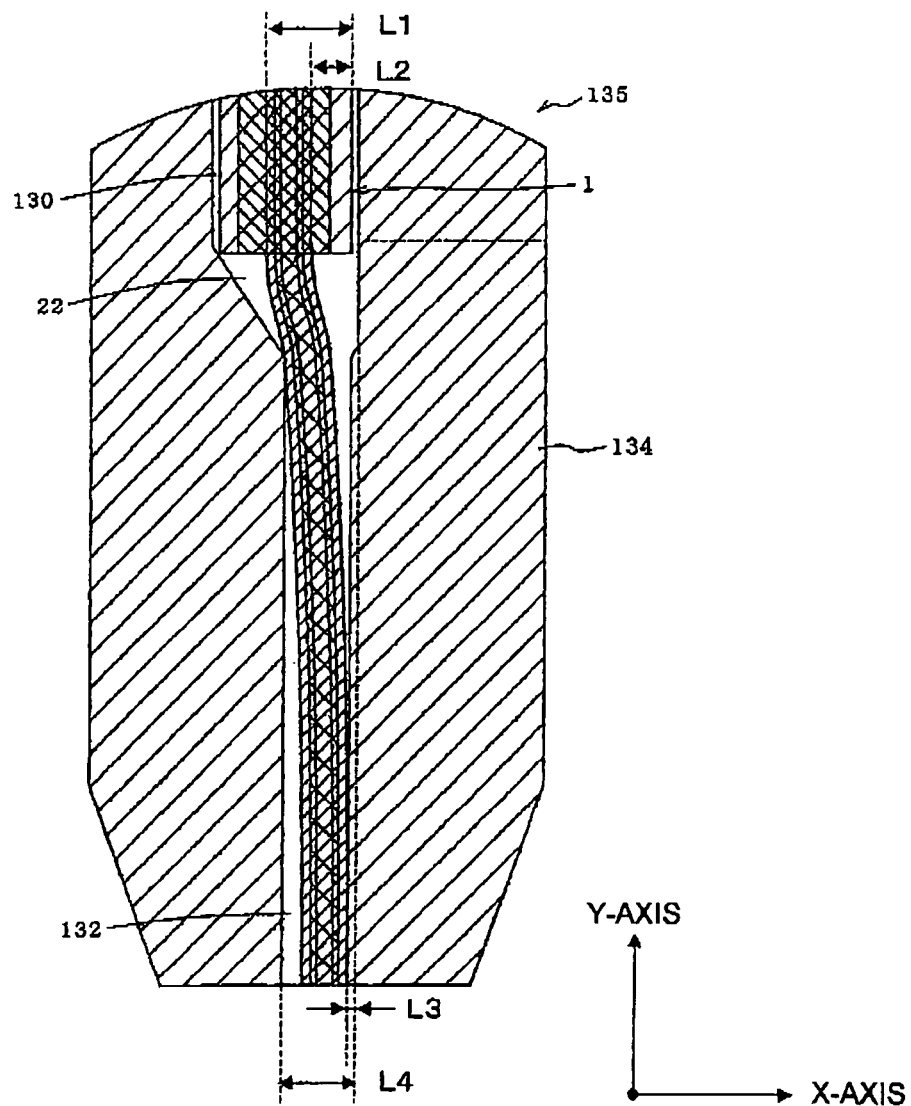
FIG. 4 is an explanatory diagram showing a condition under which the single-core optical fiber of FIG. 1A is restricted by the ferrule.

Next, embodiments according to the present invention will be explained below in conjunction with appended drawings.

FIG. 1A is a transversal cross-sectional view of a single-core optical fiber 1 in an embodiment according to the present invention. FIG. 1B is a transversal cross-sectional view of a tape-like optical fiber 10 in another embodiment according to the present invention.

First Embodiment

Next, the single-core optical fiber 1 in the first embodiment according to the present invention will be explained.

(Total Structure of the Single-Core Optical Fiber 1)

The single-core optical fiber 1 in the present embodiment is, for example, suitable to be connected and bonded to an optical fiber coupling part 135 as shown in FIGS. 13A to 13E having a ferrule 134, in which a center position 131 of an optical fiber insertion hole 130 and a center position 133 of a light input/output bore 133 are shifted from each other.

Referring to FIG. 1A, the optical fiber (single-core optical fiber) 1 in the present embodiment comprises a single-layer coated optical fiber 6 in which a single coating layer 5 (first coating layer) which is coated around an outer periphery of an optical bare fiber 4 having a core 2 and a clad 3 around the core 2, an inner coating layer 7 (second coating layer) which is coated around an outer periphery of the single-layer coated optical fiber 6 and formed to contact the single coating layer 5, and an outer coating layer 8 (third coating layer) formed around an outer side of the inner coating layer 7. The inner coating layer 7 has a lower Young modulus (E2) than a Young modulus (E1) of the single coating layer 5 and a Young modulus (E3) of the outer coating layer 8. In other words, the relationship between the Young modulus (E2) of the inner coating layer 7 and the Young modulus (E1) of the single coating layer 5 and the relationship between the Young modulus (E2) of the inner coating layer 7 and the Young modulus (E3) of the outer coating layer 8 are represented as $E2<E1$ and $E2<E3$, respectively.

The Young modulus (E1) of the single coating layer 5 (the first coating layer) is preferably 100 MPa or more, with considering polishing property at a bottom surface (end face formed on the other side of the light input/output bore 132) of the ferrule 134, suppression of the deformation of the coating layer configuration due to the bending stress within the ferrule 134, and the like.

Additionally, the Young modulus (E2) of the inner coating layer 7 (the second coating layer) is preferably 10 MPa or less, for the purpose of providing a coating removal property of the second coating layer 7, relaxing stress concentration to a coating-removed part when bending occurs in the single-core optical fiber 1 within the ferrule 134, and reducing the micro bending loss due to a lateral pressure outside the ferrule 134.

Additionally, the Young modulus (E3) of the outer coating layer 8 (the third coating layer) is preferably 50 MPa or more for the purpose of maintaining the configuration of the optical fiber. Also, the relationship between the Young modulus (E3) of the outer coating layer 8 (the third coating layer) and the Young modulus (E1) of the single coating layer 5 (the first coating layer) is selectable in either $E3<E1$ or $E1<E3$. In other words, the relationship between the Young modulus (E1) of the single coating layer 5, the Young modulus (E2) of the inner coating layer 7, and the Young modulus (E3) of the outer coating layer 8 is represented in either $E2<E3<E1$ or $E2<E1<E3$.

Additionally, at least the third coating layer 8 which is an outermost layer of the single-core optical fiber 1 preferably comprises a flame retardant material, and more preferably, the first coating layer 5, the second coating layer 7, and the third coating layer 8 are all made of flame retardant materials.

(Total Structure of Optical Fiber Connecting Part 1)

Next, the total structure of the optical fiber coupling part 135 will be explained in details.

FIGS. 2A to 2F are explanatory diagram showing an optical module using a single-core optical fiber of FIG. 1A, wherein FIG. 2A is a top plan view thereof, FIG. 2B is a front view thereof, FIG. 2C is a side view thereof, FIG. 2D is a perspective view thereof, FIG. 2E is a bottom view thereof, and FIG. 2F is an enlarged view of an essential part thereof.

Referring to FIGS. 2A to 2E, an optical fiber connecting part 135, for example, comprises a ferrule 134, a guide bore 21, which is formed to penetrate through the ferrule 134 from an end face on a side of one end to another end face (bottom surface) 20 on a side of another end of the ferrule 134, and guides an optical fiber (single-core optical fiber) 1 inserted from the side of the one end of the ferrule 134 toward the end face 20 on the side of the other end of the ferrule 134. The optical fiber connecting part 135 is configured to connect the end face 20 at the other end of the ferrule 134, for example, to an end face of the other ferrule, or an optical device on a substrate (not shown). Also, the connection to the substrate may be performed via a member such as lens base.

(Guide Bore 21)

The guide bore 21 comprises an optical fiber insertion hole 130 provided on the side of the one end of the ferrule 134, through which the single-core optical fiber 1 is inserted into the ferrule 134, a light input/output bore 132, which is provided on the side of the other end of the ferrule 134 and has an inner diameter smaller than an inner diameter of the optical fiber insertion hole 130, and through which a light is input and output at the end face 20 on the side of the other end of the ferrule 134, and a shape-changing bore 22 provided between the optical fiber insertion hole 130 and the light input/output bore 132, a shape of which is changed such that an inner diameter of the shape-changing bore 22 is slowly reduced along a longitudinal direction from the optical fiber insertion hole 130 toward the light input/output bore 132. The optical fiber insertion hole 130, the shape-changing bore 22, and the light input/output bore 132 are continuously formed and they are communicated with each other.

(Shape-Changing Bore 22)

Referring to FIG. 2A, the configuration of the shape-changing bore 22 is changed in such a manner that a center axis of the light input/output bore 132 is shifted along a direction for restricting the optical fiber (i.e. restricting direction) with respect to a center axis of the optical fiber insertion hole 130. The direction for restriction is indicated by a white arrow in FIG. 2F. In other words, in the optical fiber connecting part 135, a center position of the optical fiber insertion hole 130 to which the single-core optical fiber 1 is inserted and a center position of the light input/output bore 132 which inputs and outputs the light of the optical fiber to the outside of the ferrule 134 are shifted from each other.

Alternatively, the configuration of the shape-changing bore 22 may be varied in such a manner that the center axis of the light input/output bore 132 is shifted along a vertical direction with respect to the center axis of the optical fiber insertion hole 130.

It is preferable that an inclination angle of an inner surface of the shape-changing bore 22 with respect to an insertion direction of the optical fiber is varied in a circumferential direction as shown in FIGS. 2B to 2D.

In addition, the shape-changing bore 22 is configured to slowly and directly connect between the light input/output bore 132 and the optical fiber insertion hole 130. If this shape-changing bore 22 is not provided, a level difference (step portion) will be provided in the guide bore 21, since a diameter of the optical fiber insertion hole 130 is different from a diameter of the light input/output bore 132. If the level difference is formed in the guide bore 21, a tip end (nose) of the optical fiber will be caught by the level difference when the optical fiber is inserted into the guide bore 21, so that it will be difficult to insert the optical fiber until the light input/output bore 132. In other words, the shape-changing bore 22 is provided to facilitate the insertion of the optical fiber into the guide bore 21.

(The Optical Fiber Insertion Hole 130)

The optical fiber insertion hole 130 is slowly increased in diameter toward the side of the one end of the ferrule 134 to which the optical fiber inserted (i.e. upper part in FIGS. 2B to 2D), so that the optical fiber can be inserted easily into the optical fiber insertion hole 130.

(Connection of the Single-Core Optical Fiber 1 to the Optical Fiber Connecting Part 135)

FIGS. 3A to 3C are explanatory diagram showing the optical module using the single-core optical fiber of FIG. 1A, wherein FIG. 3A is a top plan view thereof, FIG. 3B is a cross sectional view along A-A line thereof, and FIG. 3C is an enlarged view of a part B thereof.

Referring to FIGS. 3A to 3C, when the single-core optical fiber 1 is connected to the optical fiber connecting part 1, the coating layers (the second coating layer 7 and the third coating layer 8) of the single-core optical fiber 1 is firstly removed to expose the first coating layer 5 to the outside from the single-core optical fiber 1. Subsequently, the guide bore 21 is filled with the adhesive 24. Thereafter, the single-core optical fiber 1 is inserted into the guide bore 21 which is filled with the adhesive 24. After insertion of the single-core optical fiber 1, the adhesive 24 filling the guide bore 21 is cured. Thereafter, the bottom surface 20 of the ferrule 134 is polished, and an end face of the core 2 and an end face of the clad 3 of the single-core optical fiber 1 are exposed on the same surface (plane) as that of the bottom surface 20. According to the above process, the single-core optical fiber 1 is connected and bonded to the optical fiber connecting part 135.

In the optical fiber connecting part 135, the center position of the light input/output bore 132 and the center position of the optical fiber insertion hole 130 are geometrically shifted from each other, the single-core optical fiber 1 is fixed in bent state within the ferrule 134. In other words, the single-core optical fiber 1 is bent at a connecting part (i.e. the shape-changing bore 22) between the light input/output bore 132 and the optical fiber insertion hole 130, so that it is possible to restrict the position of the single-core optical fiber 1 in a direction toward the light input/output bore 132 by a bending stress, as shown in FIG. 2F.

At this time, as shown in FIGS. 3A to 3C, the optical bare fiber 4 (i.e. the core 2 and the clad 3) of the single-core optical fiber 1 is not exposed to the outside owing to the first coating layer 5, so that it is possible to prevent the optical bare fiber 4 from directly contacting to the ferrule 134, which greatly reduces the probability that the single-core optical fiber 1 is broken.

Additionally, at the local bending part 30 where the second coating layer 7 and the third coating layer 8 are removed, the bending stress is applied intensively (concentrated) on the single-layer coated optical fiber 6 comprising the optical bare fiber 4 composed of the core 2 and the clad 3 and the first coating layer 5. Because the second coating layer 7 has the Young modulus ($E2$) lower than the Young modulus ($E1$) of the first coating layer 5 and the Young modulus ($E3$) of the third coating layer 8, it is possible to relax the stress concentration. Therefore, it is possible to prevent the single-core optical fiber 1 from breaking, even though the local bending force is applied to the single-core optical fiber 1 at the local bending part 30.

(Condition for Restricting the Optical Fiber)

FIG. 4 is an explanatory diagram showing a condition under which the single-core optical fiber 1 of FIG. 1A is restricted by the ferrule 134.

According to the structure of the single-core optical fiber 1 in the present embodiment, the condition for restricting the single-core optical fiber 1 within the ferrule 134 is to satisfy $L1>L4$ and $L2>L3$ in the configuration as shown in FIG. 4, wherein $L1$ is a maximum distance between an outer surface of the outermost coating layer (third coating layer 8) and an outer surface of the first coating layer (first coating layer 5), $L2$ is a minimum distance between the outer surface of the outermost coating layer (third coating layer 8) and an outer surface of the first coating layer (first coating layer 5), $L3$ is a shortest distance between an inner surface of the optical fiber insertion hole 130 and an inner surface of the light input/output bore 132 along an X-axis direction, and $L4$ is a sum of the shortest distance $L3$ and a diameter of the light input/output bore 132.

The single-core optical fiber 1 is restricted inside the ferrule 134 by satisfying the above condition.

Herein, it is preferable that a configuration of a space between the light input/output bore 132 and the optical fiber insertion hole 130 in a Y-axis direction is slowly varied such that the single-core optical fiber 1 from which the second coating layer 7 and the third coating layer 8 are removed can be easily inserted into the optical fiber insertion hole 130.

Advantages of the First Embodiment

According to the single-core optical fiber, 1 in the present embodiment, the single-core optical fiber 1 comprises the single-layer coated optical fiber 6 in which the single coating layer (first coating layer) 5 which is coated around the outer periphery of the optical bare fiber 4 having the core 2 and the clad 3 around the core 2, the inner coating layer (second coating layer) 7 which is coated around the outer periphery of the single-layer coated optical fiber 6 and formed to contact the single coating layer 5, and the outer coating layer (third coating layer) 8 formed around the outer side of the inner coating layer 7, in which the inner coating layer 7 has the lower Young modulus (E2) than the Young modulus (E1) of the single coating layer 5 and the Young modulus (E3) of the outer coating layer 8. Therefore, it is possible to prevent the single-core optical fiber 1 from breaking when the local bending force is applied on the single-core optical fiber 1. Also, when the single-core optical fiber 1 is bound (restricted) inside the ferrule 134, the bending stress applied on the optical bare fiber 4 (i.e. the core 2 and the clad 3) is absorbed by the first coating layer 5, and thus the optical bare fiber 4 is protected. Therefore, it is possible to prevent the single-core optical fiber 1 from breaking.

Additionally, because the first coating layer 5 has high Young modulus and the second coating layer 7 has low Young modulus, when the second coating layer 7 and the third coating layer 8 are removed, the second coating layer 7 and the third coating layer 8 can be removed easily without damaging the clad 3.

Second Embodiment

Next, the tape-like optical fiber 10 in the second embodiment according to the present invention will be explained.

Referring to FIG. 1B, the tape-like optical fiber 10 comprising a plurality of single-layer coated optical fibers (single-layer optical fibers) 6 as described above that are arranged geometrically in parallel, an inner coating layer 11 (the second coating layer) provided around an outer periphery of the single-layer optical fibers 6 arranged in parallel, and an outer coating layer 12 (the third coating layer) provided around the inner coating layer 11 sequentially as a collective coating layer.

The inner coating layer 11 preferably has a lower Young modulus (E2) than a Young modulus (E1) of the single coating layer 5 and a Young modulus (E3) of the outer coating layer 12. In other words, the relationship between the Young modulus (E2) of the inner coating layer 11 and the Young modulus (E1) of the single coating layer 5 and the relationship between the Young modulus (E2) of the inner coating layer 11 and the Young modulus (E3) of the outer coating layer 12 are represented as E2<E1 and E2<E3, respectively.

The Young modulus (E1) of the first coating layer 5 is preferably 100 MPa or more, with considering polishing property at a bottom surface (end face formed on the other side of the light input/output bore 54) of the ferrule 52, suppression of the deformation of the coating layer configuration due to the bending stress within the ferrule 52, and the like.

Additionally, the Young modulus (E2) of the second coating layer 11 is preferably 10 MPa or less, for the purpose of providing a coating removal property of the second coating layer 11, relaxing stress concentration to a coating-removed part when bending occurs in the tape-like optical fiber 10 within the ferrule 52, and reducing the micro bending loss due to a lateral pressure outside the ferrule 52.

Additionally, the Young modulus (E3) of the third coating layer 12 is preferably 50 MPa or more for the purpose of maintaining the configuration of the optical fiber. Also, the relationship between the Young modulus (E3) of the third coating layer 12 and the Young modulus (E1) of the first coating layer 5 is selectable in either E3<E1 or E1<E3. In other words, the relationship between the Young modulus (E1) of the first coating layer 5, the Young modulus (E2) of the second coating layer 11, and the Young modulus (E3) of the third coating layer 12 is represented in either E2<E3<E1 or E2<E1<E3.

Additionally, at least the third coating layer 12 which is an outermost layer of the tape-like optical fiber 10 preferably comprises a flame retardant material, and more preferably, the first coating layer 5, the second coating layer 11, and the third coating layer 12 are all made of flame retardant materials.

The outer diameter of the single-layer optical fiber 6 is preferably the same as arrangement pitch of optical coupling objects such as light emitting device, light receiving device, or lens provided on the lens base.

(Total Structure of Optical Fiber Connecting Part 50)

Next, the total structure of the optical fiber coupling part 50 will be explained in details.

Figure 5A:
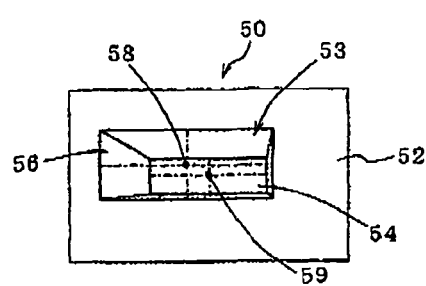
Figure 5B:
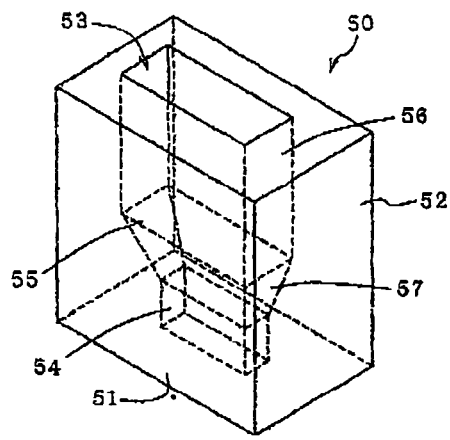
Figure 5C:
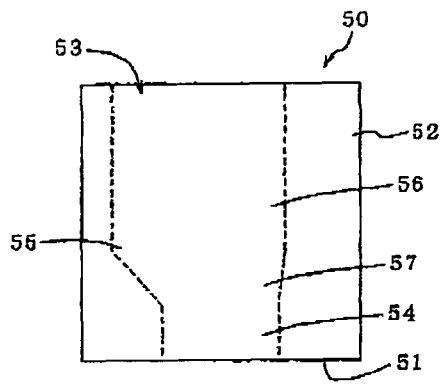
Figure 5D:
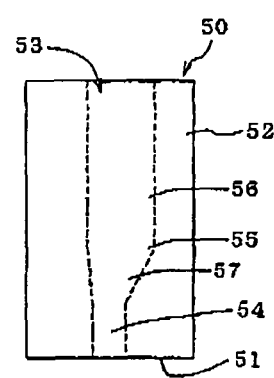
Figure 5E:
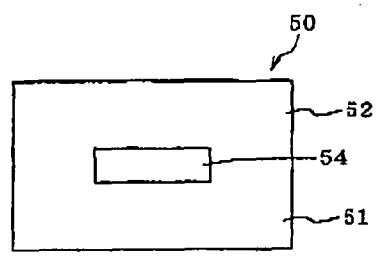

FIGS. 5A to 5E are explanatory diagram showing the optical fiber connecting part 50 to which the tape-like optical fiber 10 of FIG. 1B is connected and bonded, wherein FIG. 5A is a top plan view thereof, FIG. 5B is a perspective view thereof, FIG. 5C is a front view thereof, FIG. 5D is a side view thereof, and FIG. 5E is a bottom view thereof.

Referring to FIGS. 5A to 5E, the optical fiber coupling part 50, to which the tape-like optical fiber 10 is connected and bonded, comprises a ferrule 52 having a bottom surface 51 that is positioned horizontal to a substrate (not shown), and a guide bore 53 formed on the ferrule 52, which positions and aligns the tape-like optical fiber 10.

(Guide Bore 53)

The guide bore 53 comprises a light input/output bore 54 having a rectangular cross section to hold an end face of the tape-like optical fiber 10 to face to an arrayed optical device at a bottom surface 51 of the ferrule 52 which faces to the substrate, in order to input the light into and output the light from the tape-like optical fiber 10 to the arrayed optical device, an optical fiber insertion hole 56 having an inner diameter greater than an inner diameter of the light input/output bore 54, a center position shifted from a center position of the light input/output bore 54 and an opening 55 having a rectangular cross section at its lower end, through which the insertion of the tape-like optical fiber 10 is guided, and a shape-changing bore 57 which slowly guides the tape-like optical fiber 10 that is inserted from the optical fiber insertion hole 56 toward the light input/output bore 54.

In other words, similarly to the optical fiber coupling part 135 in FIGS. 2A to 2F, in the optical fiber coupling part 50, a center position 58 of the optical fiber insertion hole 56 through which the tape-like optical fiber 10 is inserted is shifted from a center position 59 of the light input/output bore 54 which inputs the light into an outputs the light from the tape-like optical fiber 10 to the outside of the ferrule 52 in a thickness direction and a width direction of the tape-like optical fiber 10.

(Optical Module 60)

Figure 6A:
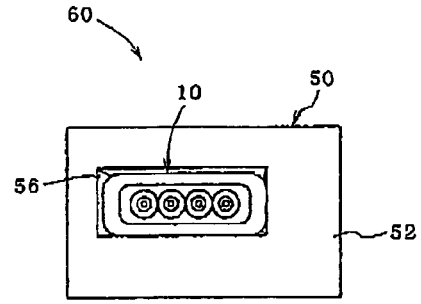
Figure 6B:
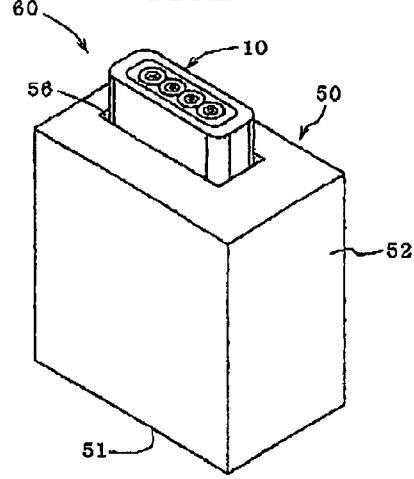
Figure 6C:
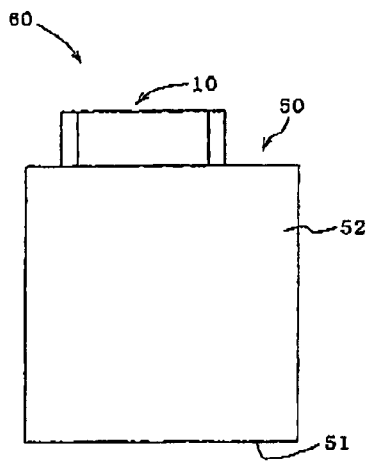
Figure 6D:
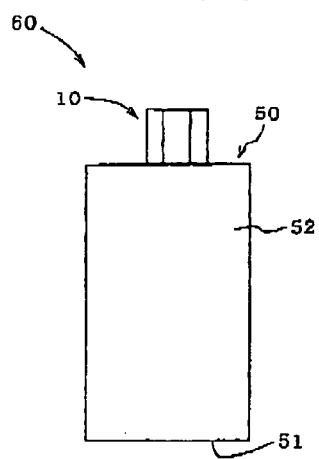
Figure 6E:
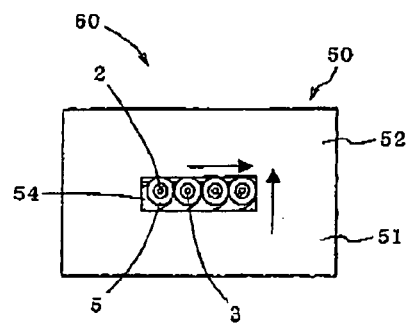
Figure 9A:
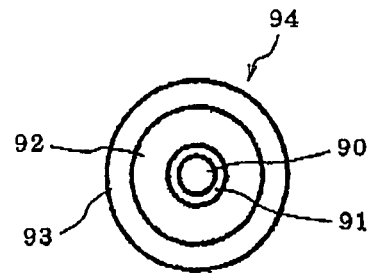
FIG. 9A is a transversal cross-sectional view of a conventional the single-core optical fiber and FIG. 9B is a transversal cross-sectional view of a conventional tape-like optical fiber.
Figure 9B:
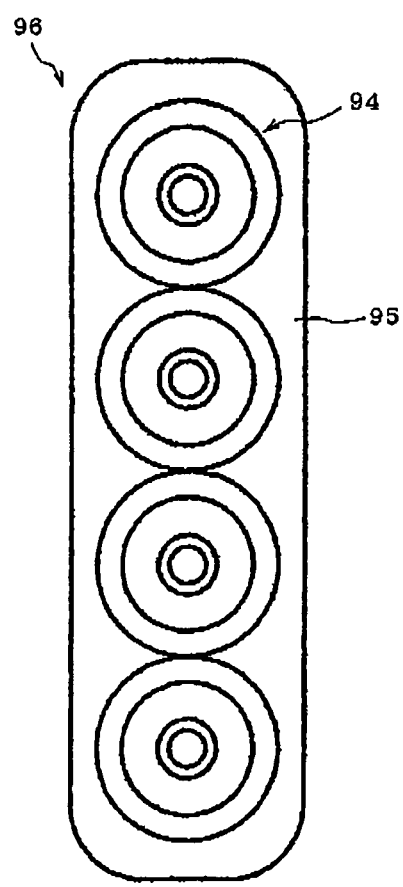
Figure 10A:
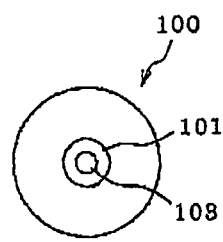
Figure 10B:
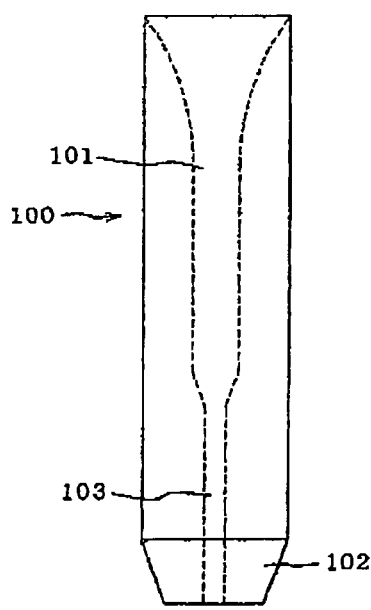
Figure 10C:
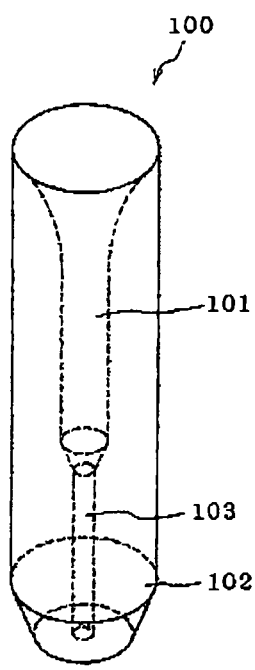
Figure 11:
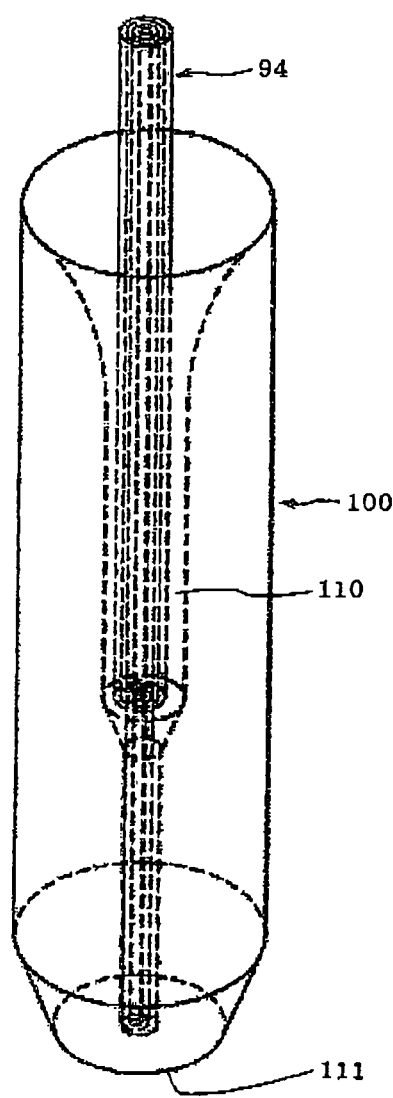
FIG. 11 is an explanatory diagram showing a conventional optical module in which the single-core optical fiber of FIG. 9A is connected to the optical fiber connecting part of FIGS. 10A to 10C.
Figure 12A:
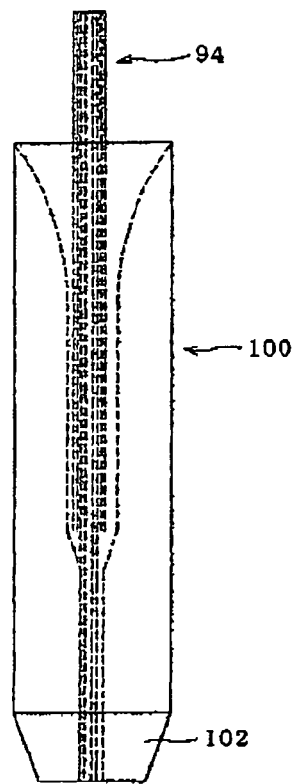
Figure 12B:
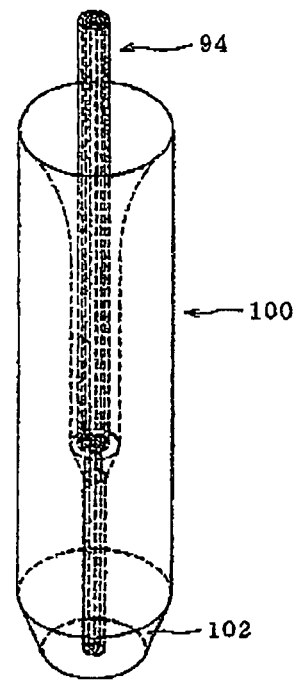
Figure 12C:
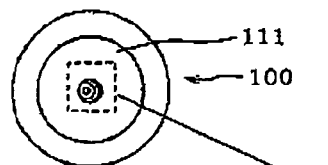
Figure 12D:
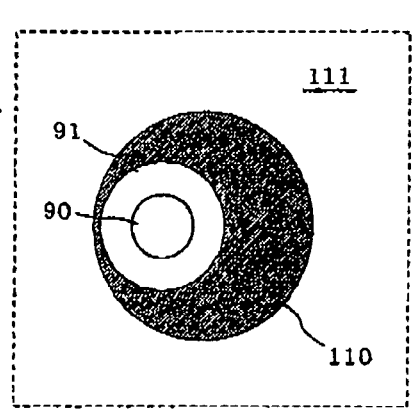
Figures 15A, 15B, 15C:
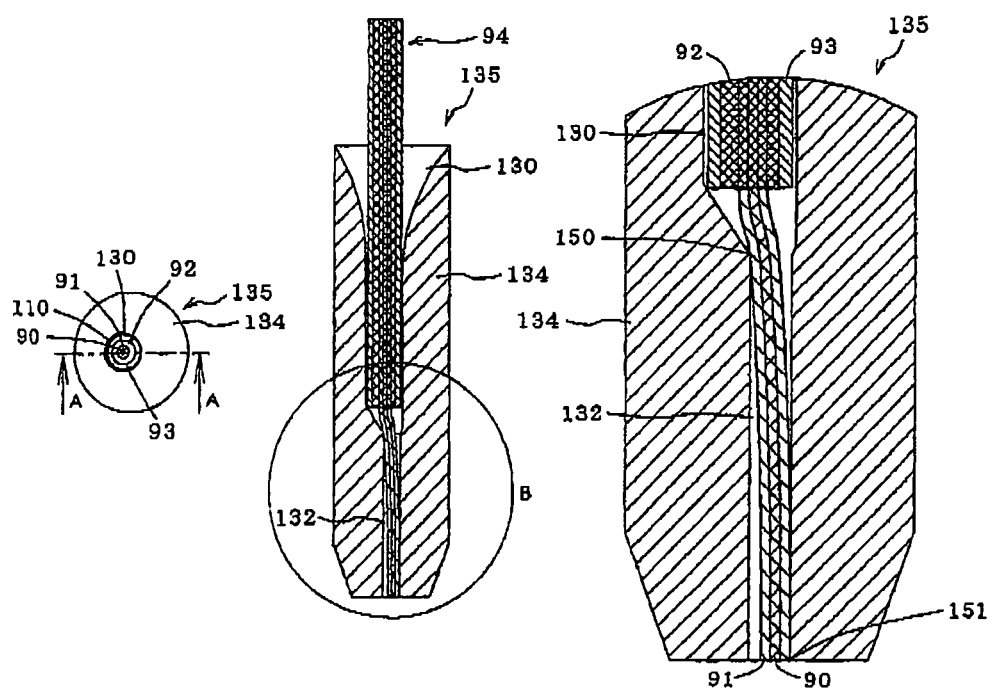

FIGS. 6A to 6E are explanatory diagram showing an optical module 60, in which the tape-like optical fiber 10 of FIG. 1B is connected and bonded to the optical fiber connecting part 50 of FIGS. 5A to 5E, wherein FIG. 6A is a top plan view thereof, FIG. 6B is a perspective view thereof, FIG. 6C is a front view thereof, FIG. 6D is a side view thereof, and FIG. 6E is a bottom view thereof.

FIG. 7 is an explanatory diagram showing a condition under which the tape-like optical fiber 10 of FIG. 1B is restricted by the ferrule 52.

In FIGS. 6E and 7A, the restriction directions (left horizontal direction and right upper direction) are indicated by arrows.

As described above, it is possible to obtain following effect by shifting the center axis of the optical fiber insertion hole 56 from the center axis of the light input/output bore 54. Namely, when the tape-like optical fiber 10 is inserted into the guide bore 53 of the optical fiber connecting part 50 after removing the second coating layer 11 and the third coating layer 12 at a tip end of the tape-like optical fiber 10, the tape-like optical fiber 10 is bent within the ferrule 52, positions of respective cores 2 of the tape-like optical fiber 10 are restricted to a corner of the light input/output bore 54 at the bottom surface 51 of the ferrule 52, so that it is possible to align the respective cores 2 of the tape-like optical fiber 10 with high precision.

(Condition for Restricting the Tape-Like Optical Fiber 10)

The condition for restricting the tape-like optical fiber 10 inside of the ferrule 52 in both of the X-axis direction and Y-axis direction is to satisfy all of L1X>L4X, L2X>L3X, L1Y>L4Y, and L2Y>L3Y in the configuration as shown in FIGS. 7B and 7C, wherein L1X is a maximum distance between an outer surface of the outermost coating layer (the third coating layer 12) and an outer surface of the first coating layer (the first coating layer 5) along the X-axis direction of FIGS. 7B and 7C, L2X is a minimum distance between the outer surface of the outermost coating layer (the third coating layer 12) and the outer surface of the first coating layer (the first coating layer 5) along the X-axis direction of FIGS. 7B and 7C, L3X is a shortest distance between an inner surface of the optical fiber insertion hole 56 and an inner surface of the light input/output bore 54 along the X-axis direction of FIGS. 7B and 7C, L4X is a sum of the shortest distance L3X and a diameter of the light input/output bore 54 along the X-axis direction of FIGS. 7B and 7C, L1Y is a maximum distance between an outer surface of the outermost coating layer (the third coating layer 12) and an outer surface of the first coating layer (the first coating layer 5) along the Y-axis direction of FIGS. 7B and 7C, L2Y is a minimum distance between the outer surface of the outermost coating layer (the third coating layer 12) and the outer surface of the first coating layer (the first coating layer 5) along the Y-axis direction of FIGS. 7B and 7C, L3Y is a shortest distance between an inner surface of the optical fiber insertion hole 56 and an inner surface of the light input/output bore 54 along the Y-axis direction of FIGS. 7B and 7C, and L4Y is a sum of the shortest distance L3Y and a diameter of the light input/output bore 54 along the Y-axis direction of FIGS. 7B AND 7C.

The tape-like optical fiber 10 is restricted inside the ferrule 52 by satisfying the above condition.

Advantages of the Second Embodiment

According to the tape-like optical fiber 10 in the present embodiment, the tape-like optical fiber 10 comprises a plurality of single-layer coated optical fibers 6 in which the single coating layer (the first coating layer) 5 which is coated around the outer periphery of the optical bare fiber 4 having the core 2 and the clad 3 around the core 2, the inner coating layer (the second coating layer) 11 which is coated around the outer periphery of the single-layer coated optical fibers 6 and formed to contact the single coating layer 5, and the outer coating layer (the third coating layer) 12 formed as a collective coating layer around the outer side of the inner coating layer 7, in which the inner coating layer 11 has the lower Young modulus (E2) than the Young modulus (E1) of the single coating layer 5 and the Young modulus (E3) of the outer coating layer 12. Therefore, it is possible to prevent the tape-like optical fiber 10 from breaking when the local bending force is applied on the tape-like optical fiber 10. Also, when the tape-like optical fiber 10 is bound (restricted) inside the ferrule 52, the bending stress applied on the optical bare fiber 4 (i.e. the core 2 and the clad 3) is absorbed by the first coating layer 5, and thus the optical bare fiber 4 is protected. Therefore, it is possible to prevent the tape-like optical fiber 10 from breaking.

Additionally, because the first coating layer 5 has high Young modulus and the second coating layer 11 has low Young modulus, when the second coating layer 11 and the third coating layer 12 are removed, the second coating layer 11 and the third coating layer 12 can be removed easily without damaging the clad 3.

Further, because the single-layer optical fiber 6 in which the first coating layer 5 having the Young modulus of 100 MPa or more is provided around the optical bare fiber 4 is bound (restricted) inside the ferrule 52, it is possible to prevent the damages to the core 2 and clad 3 and shifting of the axis (light axis) of the core 2 in the polishing process of the end face (bottom surface) 51 of the ferrule 52 after binding.

The outer diameter of the single layer optical fiber 6 may be set to be the same as the arrangement pitch of the optical coupling objects such as light emitting device, light receiving device, or lens on the lens base. According to this structure, the respective cores 2 of the tape-like optical fiber 10 are arranged in the same arrangement pitch as that of the optical coupling objects such as light emitting device, light receiving device, or lens on the lens base, by restricting the tape-like optical fiber 10 in the ferrule 52. Therefore, each core 2 can be connected to the optical device accurately.

FIG. 8 is an explanatory diagram showing bendability of the tape-like optical fiber 10 in the present embodiment with respect to the optical fiber array direction.

Referring to FIG. 8, the tape-like optical fiber 10 according to the present embodiment can be bent in an optical fiber arrangement direction indicated by an arrow (a direction along which the single-layer optical fibers 6 are arranged) by removing the second coating layer 11 and the third coating layer 12 at a part to be bend. A bending force application part 800 to which the bending force is applied in the optical fiber arrangement direction comprises a part 80 from which the second coating layer 11 and the third coating layer 12 are removed. In the bending force application part 800, the tape-like optical fiber 10 is not broken under the bending stress by local bending, because the optical bare fiber 4 composed of the core 2 and the clad 3 is protected by the second coating layer 11 with high Young modulus. Additionally, in order to fix the bending force application part 800 (the part 80 from which the second coating layer 11 and the third coating layer 12 are removed) shown in FIG. 8 in a desired shape after applying the bending force, the coating comprising the second coating layer 11, the third coating layer 12, and the like may be recoated after setting the desired bending shape after bending.

Although the invention has been described, the invention according to claims is not to be limited by the above-mentioned embodiments and examples. Further, please note that not all combinations of the features described in the embodiments and the examples are not necessary to solve the problem of the invention.

What is claimed is:

1. A tape-like optical fiber, comprising:
   single-layer coated optical fibers disposed in parallel, each of the single-layer coated optical fibers comprising an optical bare fiber including a core and a clad formed around the core, and a single coating layer provided around an outer periphery of the optical bare fiber;
   an inner coating layer provided around an outer periphery of the single-layer coated optical fibers disposed in parallel, the inner coating layer contacting with the single coating layer; and
   a collective coating layer comprising an outer coating layer formed around an outer side of the inner coating layer,
   wherein an outer diameter of each of the single-layer coated optical fibers is the same as an arrangement pitch of optical coupling objects,
   wherein the single coating layer has a Young modulus E1, the inner coating layer has a Young modulus E2, and the outer coating layer has a Young modulus E3, and
   wherein E2<E1 and E2<E3 are established.

2. The optical fiber according to claim 1, wherein the inner coating layer has the Young modulus of 10 MPa or less.

3. The optical fiber according to claim 1, wherein the single coating layer has the Young modulus of 100 MPa or more and the outer coating layer has the Young modulus of 50 MPa or more.

4. The optical fiber according to claim 1, wherein the single coating layer, the inner coating layer, and the outer coating layer comprise flame retardant materials.

5. An optical module, comprising:
   A tape-like optical fiber comprising:
      single-layer coated optical fibers disposed in parallel, each of the single-layer coated optical fibers comprising an optical bare fiber including a core and a clad formed around the core, and a single coating layer provided around an outer periphery of the optical bare fiber;
      an inner coating layer provided around an outer periphery of the single-layer coated optical fibers disposed in parallel, the inner coating layer contacting with the single coating layer; and
      a collective coating layer comprising an outer coating layer formed around an outer side of the inner coating layer,
      wherein an outer diameter of each of the single-layer coated optical fibers is the same as an arrangement pitch of optical coupling objects,
      wherein the single coating layer has a Young modulus E1, the inner coating layer has a Young modulus E2, and the outer coating layer has a Young modulus E3, and
      wherein E2<E1 and E2<E3 are established; and
   an optical fiber connecting part, comprising:
      a ferrule; and
      a guide bore, which is formed to penetrate through the ferrule from an end face on a side of one end to another end face on a side of another end of the ferrule, and guides the optical fiber inserted from the side of the one end of the ferrule toward the end face on the side of the other end of the ferrule, the guide bore comprising:
         an optical fiber insertion hole provided on the side of the one end, through which the optical fiber is inserted into the ferrule;
         a light input/output bore provided on the side of said another end of the ferrule and having an inner diameter smaller than an inner diameter of the optical fiber insertion hole, through which a light is input and output at the end face on the side of said another end of the ferrule; and
         a shape-changing bore provided between the optical fiber insertion hole and the light input/output bore to communicate therebetween, a shape of which is changed such that an inner diameter of the shape-changing bore is slowly reduced from the optical fiber insertion hole toward the light input/output bore,
   wherein the shape of the shape-changing bore is changed such that a center axis of the light input/output bore is shifted along a direction for restricting the optical fiber with respect to a center axis of the optical fiber insertion hole.

6. An optical module, comprising:
   an optical fiber comprising:
      a single-layer coated optical fiber comprising an optical bare fiber including a core and a clad formed around the core, and a single coating layer provided around an outer periphery of the optical bare fiber;
      an inner coating layer provided around an outer periphery of the single-layer coated optical fiber, which contact with the single coating layer; and
      a collective coating layer comprising an outer coating layer formed around an outer side of the inner coating layer,
      wherein the single coating layer has a Young modulus E1, the inner coating layer has a Young modulus E2, and the outer coating layer has a Young modulus E3, and
      wherein E2<E1 and E2<E3 are established; and
   an optical fiber connecting part, comprising:
      a ferrule; and
      a guide bore, which is formed to penetrate through the ferrule from an end face on a side of one end to another end face on a side of another end of the ferrule, and guides the optical fiber inserted from the side of the one end of the ferrule toward the end face on the side of the other end of the ferrule, the guide bore comprising:
         an optical fiber insertion hole provided on the side of the one end, through which the optical fiber is inserted into the ferrule;
         a light input/output bore provided on the side of said another end of the ferrule and having an inner diameter smaller than an inner diameter of the optical fiber insertion hole, through which a light is input and output at the end face on the side of said another end of the ferrule; and
         a shape-changing bore provided between the optical fiber insertion hole and the light input/output bore to communicate therebetween, a shape of which is changed such that an inner diameter of the shape-changing bore is slowly reduced from the optical fiber insertion hole toward the light input/output bore,
   wherein the shape of the shape-changing bore is changed such that a center axis of the light input/output bore is shifted along a direction for restricting the optical fiber with respect to a center axis of the optical fiber insertion hole, and
   wherein the optical fiber is restricted within the ferrule to satisfy L2>L3, in which L2 is a minimum distance between an outer surface of the outer coating layer and an outer surface of the single coating layer, and L3 is a shortest distance between an inner surface of the optical fiber insertion hole and an inner surface of the light input/output bore.

7. The optical module according to claim 6, wherein the optical fiber is further restricted within the ferrule to satisfy L1>L4, in which Ll is a maximum distance between the outer surface of the outer coating layer and the outer surface of the single coating layer, and L4 is a sum of the shortest distance L3 and a diameter of the light input/output bore.

8. The optical module according to claim 6, wherein the inner coating layer has the Young modulus of 10 MPa or less.

9. The optical module according to claim 6, wherein the single coating layer has the Young modulus of 100 MPa or more and the outer coating layer has the Young modulus of 50 MPa or more.

10. The optical module according to claim 6, wherein $E2<E3<E1$ is established.

11. The optical module according to claim 6, wherein $E2<E1<E3$ is established.

* * * * *